United States Patent
Kizaki

(10) Patent No.: US 10,801,686 B2
(45) Date of Patent: Oct. 13, 2020

(54) LIGHTING APPARATUS

(71) Applicant: HONDA MOTOR CO., LTD., Tokyo (JP)

(72) Inventor: Tokujiro Kizaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/737,305

(22) Filed: Jan. 8, 2020

(65) Prior Publication Data

US 2020/0256535 A1    Aug. 13, 2020

(30) Foreign Application Priority Data

Feb. 13, 2019   (JP) .................................. 2019-023611

(51) Int. Cl.
| | |
|---|---|
| *F21S 41/24* | (2018.01) |
| *F21S 41/20* | (2018.01) |
| *F21S 41/151* | (2018.01) |
| *F21S 45/49* | (2018.01) |
| *F21Y 115/10* | (2016.01) |
| *B62J 6/026* | (2020.01) |
| *F21S 45/47* | (2018.01) |
| *F21S 41/663* | (2018.01) |
| *F21S 41/147* | (2018.01) |
| *F21S 41/19* | (2018.01) |

(Continued)

(52) U.S. Cl.
CPC ............... *F21S 41/24* (2018.01); *B62J 6/026* (2020.02); *F21S 41/147* (2018.01); *F21S 41/151* (2018.01); *F21S 41/19* (2018.01); *F21S 41/28* (2018.01); *F21S 41/663* (2018.01); *F21S 45/47* (2018.01); *F21S 45/49* (2018.01); *F21S 41/334* (2018.01); *F21W 2107/17* (2018.01); *F21Y 2115/10* (2016.08)

(58) Field of Classification Search
CPC .......... F21S 41/24; F21S 41/28; F21S 41/663; F21S 41/147; F21S 41/151; F21S 41/19; F21S 41/334; F21S 45/47; F21S 45/49; B62J 6/02; B62J 6/022; B62J 6/026; F21W 2107/17; B60Q 1/04
See application file for complete search history.

(56) References Cited

U.S. PATENT DOCUMENTS

| | | | |
|---|---|---|---|
| 9,676,437 B2 * | 6/2017 | Takenaka | ............... F21S 43/249 |
| 2014/0293629 A1 * | 10/2014 | Otsuji | ................... F21S 41/192 |
| | | | 362/475 |

(Continued)

FOREIGN PATENT DOCUMENTS

| | | | | |
|---|---|---|---|---|
| JP | 6270679 | | 1/2018 | |
| WO | WO-2014157353 A1 * | | 10/2014 | ................ B62J 6/02 |

*Primary Examiner* — Alan B Cariaso
(74) *Attorney, Agent, or Firm* — Rankin, Hill & Clark LLP

(57) ABSTRACT

A lighting apparatus includes: a housing; a lens that covers a front surface of the housing; main lighting bodies housed in the housing, the main lighting bodies including left and right two headlights emitting light; a light guide member formed into an ω-shape to extend continuously along peripheries of the two-headlight main lighting bodies; and an extension that partially covers the light guide member from a front. Light source groups that emit light to be guided to the light guide member are disposed on upper end portions at left and right of the ω-shape. The light guide member has a center bent portion bent at a position posterior to the extension.

9 Claims, 9 Drawing Sheets

(51) Int. Cl.
*F21W 107/17* (2018.01)
*F21S 41/33* (2018.01)

(56) References Cited

U.S. PATENT DOCUMENTS

| | | | |
|---|---|---|---|
| 2015/0029738 A1* | 1/2015 | Takenaka | F21S 45/50 |
| | | | 362/474 |
| 2015/0124467 A1* | 5/2015 | Kuriki | B60Q 1/0041 |
| | | | 362/475 |
| 2016/0236743 A1* | 8/2016 | Kheawhorm | B60Q 1/0082 |
| 2020/0072431 A1* | 3/2020 | Shih | F21S 41/19 |

* cited by examiner

LIGHTING APPARATUS

INCORPORATION BY REFERENCE

The present application claims priority under 35 U.S.C. § 119 to Japanese Patent Application No. 2019-023611 filed on Feb. 13, 2019. The content of the application is incorporated herein by reference in its entirety.

TECHNICAL FIELD

The present invention relates to a lighting apparatus.

BACKGROUND ART

A hitherto known configuration of a lighting apparatus includes light-emitting portions (illuminating portions) of a light guide member separately on left and right sides (see, for example, Patent Document 1).

PRIOR ART DOCUMENT

Patent Document

[Patent Document 1]
Japanese Patent No. 6270679

SUMMARY OF THE INVENTION

Problem to be Solved by the Invention

In the configuration disclosed in Patent Document 1, the left and right light-emitting portions of the lighting apparatus are not continuous and an amount of light decreases on the side of a central portion of the light guide member, which is spaced farther away from the light sources. Moreover, light tends to leak to the outside from ends on the side of the central portion of the left and right light-emitting portions, which affects appearance of the lighting apparatus. Additionally, the light guide member is not shaped uniformly at different parts thereof, so that cost increases.

An object of the present invention is to provide a lighting apparatus that includes a light guide member capable of obtaining the amount of light, improving appearance, and reducing cost.

Means for Solving the Problem

To achieve the foregoing object, an aspect of the present invention provides a lighting apparatus including: a housing (61); a lens (51) that covers a front surface of the housing (61); a pair of main lighting bodies (65) housed in the housing (61), the main lighting bodies (65) including left and right two headlights emitting light; a light guide member (71) formed to extend continuously along peripheries of the two-headlight main lighting bodies (65); and an extension (72) that partially covers the light guide member (71) from a front. In the lighting apparatus, the light guide member (71), and a light guide member light source (77) emitting light to be guided to the light guide member (71), constitute a subsidiary lighting body (66), and the light guide member (71) has a central portion (71d) bent at a position posterior to the extension (72).

In the foregoing configuration, preferably, the light guide member (71) is formed into an ω-shape in a vehicle front view, and the light guide member light source (77) is disposed at each upper end portion on both sides in a vehicle width direction of the ω-shape.

In the foregoing configuration, preferably, the light guide member light source (77) is an LED and consumes electricity more than main lighting body light source (67, 68) included in the main lighting bodies (65) does, and a substrate (82), on which the light guide member light source (77) is mounted, is mounted, together with a heat sink (91), at each upper portions at left and right of the housing (61).

In the foregoing configuration, preferably, the light guide member light source (77) and the light guide member (71) have outer ends in the vehicle width direction disposed inside each outer end in the vehicle width direction of the main lighting bodies (65) in the vehicle width direction.

In the foregoing configuration, preferably, the light guide member (71) protrudes more anteriorly at increasing distances from the light guide member light source (77).

In the foregoing configuration, preferably, the main lighting body light source (67, 68) is an LED and disposed inferior to the light guide member light source (77).

In the foregoing configuration, preferably, an end portion mounting portion (84) mounted on the heat sink (91) is integrally formed with an end portion (71a) of the light guide member (71), and the end portion mounting portion (84) and the substrate (82) are jointly fastened to the heat sink (91).

In the foregoing configuration, preferably, the end portion mounting portion (84) has an opening portion (84a) at a position near the end portion (71a) of the light guide member (71).

In the foregoing configuration, preferably, the lighting apparatus further includes a controller (95), disposed between a pair of the light guide member light sources (77) at left and right, for controlling emission of light of the light guide member light sources (77).

Effects of the Invention

The lighting apparatus includes: the housing; the lens that covers the front surface of the housing; the pair of the main lighting bodies that are housed in the housing and include the left and right two headlights emitting light; the light guide member that is formed to extend continuously along the peripheries of the two-headlight main lighting bodies; and the extension that partially covers the light guide member from the front. The light guide member, and the light guide member light source emitting light to be guided to the light guide member, constitute the subsidiary lighting body. The central portion of the light guide member is bent at a position posterior to the extension. Because the light guide member is formed so as to continuously extend along the peripheries of the left and right main lighting bodies, an amount of light at the central portion of the light guide member can be obtained by rays of light from the left and right light sources being supplemented each other. In addition, light can be prevented from leaking to the outside and appearance of the lighting apparatus can be enhanced. Additionally, a shape of the light guide member is simplified and thus cost can be reduced.

In the foregoing configuration, the light guide member is formed into the ω-shape in the vehicle front view, and the light guide member light source is disposed at each upper end portion on both sides in the vehicle width direction of the ω-shape. Thus, the light emitted from each upper end portion of the light guide member can be brought up to the central portion of the light guide member and the amount of light at the central portion of the light guide member can be obtained.

In the foregoing configuration, the light guide member light source is the LED and consumes electricity more than the main lighting body light source included in the main lighting bodies does. The substrate, on which the light guide member light source is mounted, is mounted, together with the heat sink at each upper portion at left and right of the housing. Disposing the light guide member light source having a high heat value at each upper portion at left and right of the housing, together with the heat sink, allows heat dissipation from the light guide member light source to be promoted.

In the foregoing configuration, the outer ends in the vehicle width direction of the light guide member light source and the light guide member are disposed inside each outer end in the vehicle width direction of the main lighting bodies in the vehicle width direction. Thus, a width of the upper portion of the lighting apparatus in the vehicle width direction can be narrowed and reduction in size of the lighting apparatus can be promoted.

In the foregoing configuration, the light guide member protrudes more anteriorly at increasing distances from the light guide member light source. Thus, the light emitted from the light guide member light source can be efficiently brought up to the central portion of the light guide member.

In the foregoing configuration, the main lighting body light source is an LED and disposed inferior to the light guide member light source. The main lighting body light source that consumes electricity less than the light guide member light source does is disposed inferior to the light guide member light source, so that performance of the lighting apparatus to dissipate heat can be promoted. Additionally, the main lighting body light source is spaced vertically away from the light guide member light source. This enables a thermal effect from the light guide member light source on the main lighting body light source to be reduced.

In the foregoing configuration, the end portion mounting portion mounted on the heat sink is integrally formed with the end portion of the light guide member, and the end portion mounting portion and the substrate are jointly fastened to the heat sink. Thus, the light guide member and the substrate can be easily mounted on the heat sink, so that assemblability can be enhanced.

In the foregoing configuration, the end portion mounting portion has the opening portion at a position near the end portion of the light guide member. Thus, heat can be dissipated from the opening portion, so that temperature of the light guide member light source can be prevented from rising.

In the foregoing configuration, the controller that controls emission of light of the light guide member light source is disposed between the pair of the light guide member light sources at left and right. The controller can thus be disposed through an effective use of a dead space superior to the light guide member having the ω-shape in the front view.

MODE FOR CARRYING OUT THE INVENTION

Figure 1:
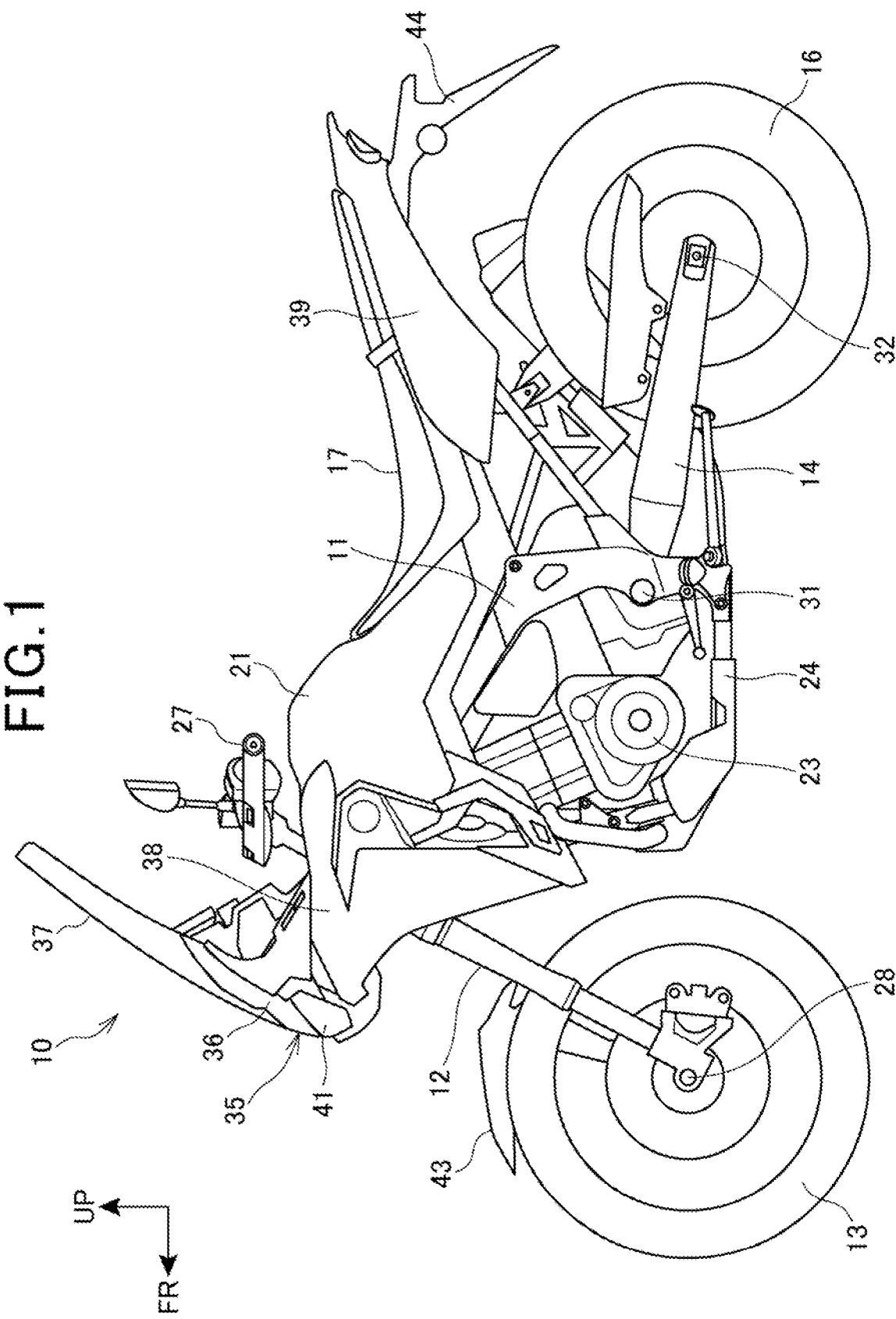
FIG. 1 is a left side elevation view of a motorcycle including a headlight according to an embodiment of the present invention.

A specific embodiment to which the present invention is applied will be described below with reference to the accompanying drawings. Throughout the descriptions given hereunder, expressions indicating directions including front and rear, right and left, and upper and lower mean the same directions as those in a vehicle body unless otherwise specified. In the drawings, an arrow FR indicates an anterior direction of the vehicle body, an arrow UP indicates a superior direction of the vehicle body, and an arrow LH indicates a leftward direction of the vehicle body.

FIG. 1 is a left side elevation view of a motorcycle 10, which includes a headlight 41 according to an embodiment of the present invention.

The motorcycle 10 includes a vehicle body frame 11, a front wheel 13, a rear wheel 16, and a seat 17. The vehicle body frame 11 constitutes a framework. The front wheel 13 is supported at a front end portion of the vehicle body frame 11 via a front fork 12. The rear wheel 16 is supported at a lower portion of the vehicle body frame 11 via a swing arm 14. The seat 17 provides a place in which an occupant sits.

The motorcycle 10 is a saddle riding vehicle in which the occupant straddles the seat 17.

A fuel tank 21, which is disposed anterior to the seat 17, is supported at an upper portion of the vehicle body frame 11. An engine 23, which is disposed inferior to the fuel tank 21, is supported at a lower portion of the vehicle body frame 11. A skid plate 24, which is mounted on the vehicle body frame 11 to thereby cover the engine 23 from below, is disposed inferior to the engine 23.

The front fork 12 is steerably supported by a head pipe (not depicted) disposed at a front end portion of the vehicle body frame 11. A handlebar 27 is mounted at an upper portion of the front fork 12. The front wheel 13 is supported via an axle 28 at a lower end portion of the front fork 12.

The swing arm 14 has a front end portion oscillatably supported by a pivot shaft 31, which is disposed at a lower portion of the vehicle body frame 11. The swing arm 14 has a rear end portion supporting the rear wheel 16 via an axle 32.

A vehicle body cover 35 covers the vehicle body frame 11 and different parts of the vehicle body.

The vehicle body cover 35 includes a front cover 36, a windscreen 37, a pair of left and right radiator shrouds 38, an a pair of left and right rear covers 39.

The front cover 36 covers a front portion of the vehicle body. The headlight 41 is disposed in the front cover 36. The windscreen 37 is mounted at an upper portion of the front cover 36. The left and right radiator shrouds 38 cover a radiator (not depicted) from left and right sides. The left and right rear covers 39 cover portions of the vehicle body frame 11 inferior to the seat 17 from sides.

The front wheel 13 is covered in a front fender 43 from above and the rear wheel 16 is covered in a rear fender 44 from above.

Figure 2:
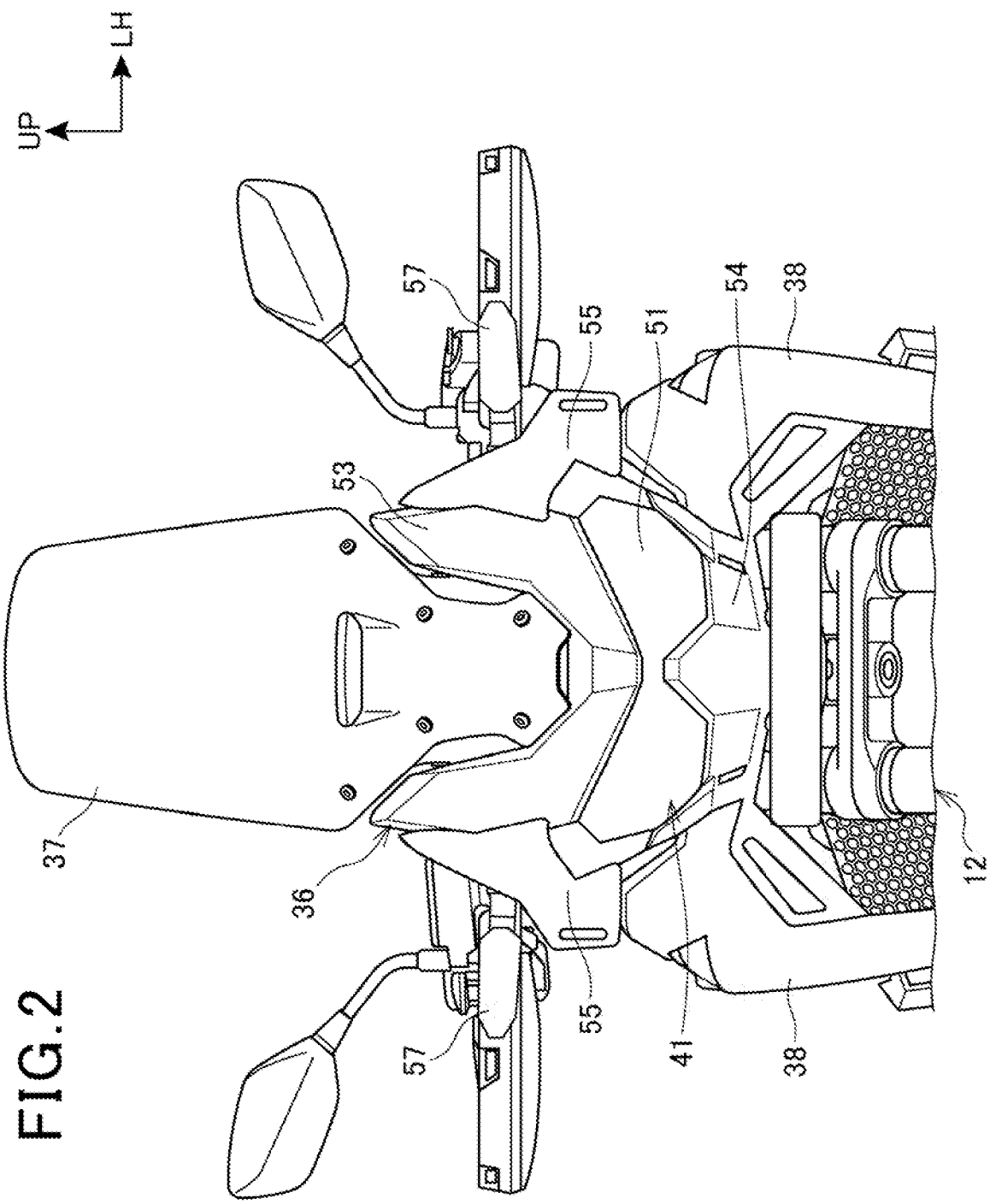
FIG. 2 is a front elevation view of a front upper portion of the motorcycle.

FIG. 2 is a front elevation view of a front upper portion of the motorcycle 10.

The headlight 41 includes a lens 51, which has a shape of spectacles integrating left and right portions.

The front cover 36 is disposed so as to surround the headlight 41. The front cover 36 includes an upper portion cover 53, a lower portion cover 54, and a pair of left and right side portion covers 55. The upper portion cover 53 is disposed superior to, the lower portion cover 54 is disposed inferior to, and the left and right side portion covers 55 are disposed on the left and right sides of, respectively, the headlight 41.

The windscreen 37 is mounted on the upper portion cover 53. The left and right radiator shrouds 38 have front end portions connected with the lower portion cover 54. A pair of left and right front blinkers 57 is mounted on the left and right side portion covers 55.

Figure 3:
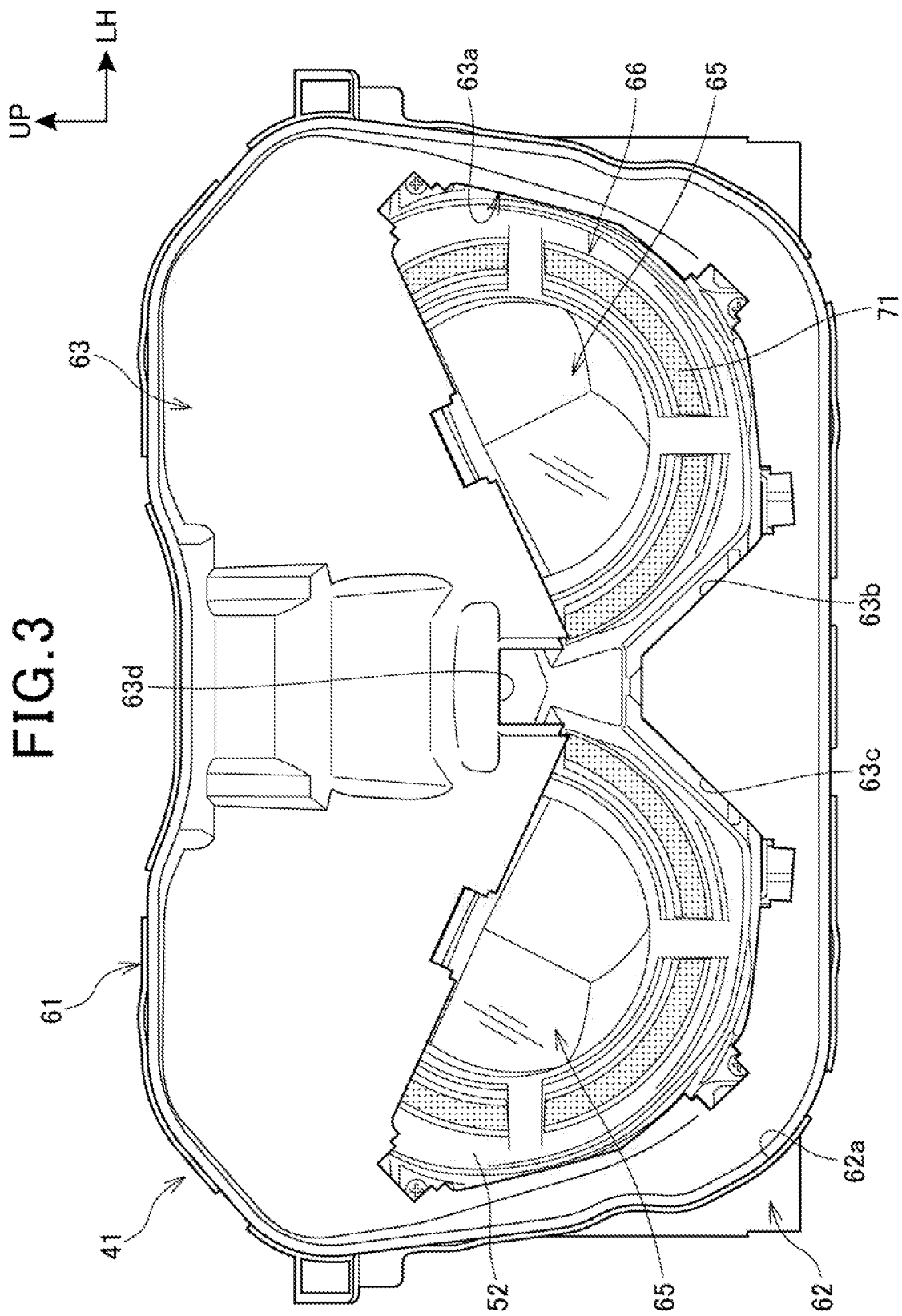
FIG. 3 is a front elevation view of the headlight.
Figure 4:
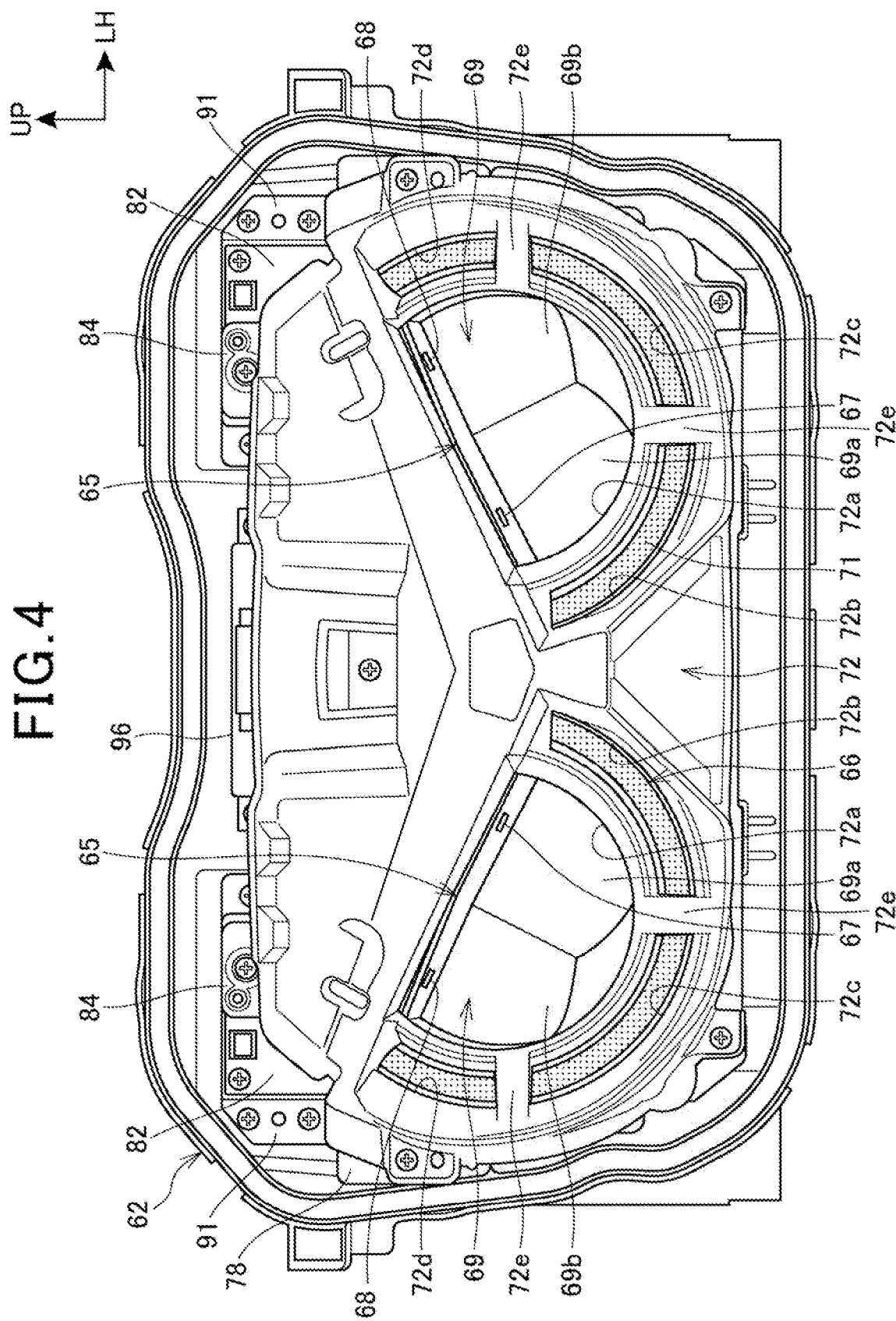
FIG. 4 is a front elevation view of the headlight, depicting a condition in which a lens and a housing cover have been removed from what is depicted in FIG. 3.

FIG. 3 is a front elevation view of the headlight 41. FIG. 4 is a front elevation view of the headlight 41, depicting a condition in which the lens 51 and a housing cover 63 have been removed from what is depicted in FIG. 3.

As depicted in FIG. 3, the headlight 41 includes the lens 51 and a housing 61. The housing 61 includes a housing main body 62 and the housing cover 63. The housing main body 62 constitutes a rear portion of the housing 61. The housing cover 63 is mounted on the housing main body 62 so as to close a front portion opening 62a in the housing main body 62.

The housing cover 63 has a lens opening portion 63a formed therein. The lens 51 is mounted on the housing cover 63 so as to close the lens opening portion 63a.

The lens opening portion 63a includes a left lighting body opening 63b, a right lighting body opening 63c, and a central opening 63d. The left lighting body opening 63b and the right lighting body opening 63c are each formed into a substantially semi-circular shape. The central opening 63d connects the left lighting body opening 63b with the right lighting body opening 63c.

Reference is made to FIG. 4. Main lighting bodies 65 including two headlights on the left and right and a subsidiary lighting body 66, which is disposed to surround the main lighting bodies 65, are disposed in the housing main body 62.

Each main lighting body 65 includes a low-beam light source 67, a high-beam light source 68, and a reflector 69. The low-beam light source 67 and the high-beam light source 68 each include a light-emitting diode (LED). The reflector 69 reflects light emitted from the low-beam light source 67 and the high-beam light source 68 to an anterior direction in the vehicle.

The high-beam light source 68 is disposed at a position obliquely superior to the low-beam light source 67 on an outer side.

The reflector 69 includes a low-beam reflection portion 69a and a high-beam reflection portion 69b. The low-beam reflection portion 69a reflects light emitted from the low-beam light source 67. The high-beam reflection portion 69b reflects light emitted from the high-beam light source 68. The high-beam reflection portion 69b is disposed at a position obliquely superior to the low-beam reflection portion 69a on an outer side.

The subsidiary lighting body 66 includes a light guide member 71. The light guide member 71 integrates left and right parts together and can emit light. The light guide member 71 has a portion thereof covered in a covering extension 72 from the front (from an anterior direction in the vehicle body; the same holds also in the following). The light guide member 71 is indicated by a plurality of dots (in FIGS. 3 to 9) to facilitate understanding of a shape thereof.

The extension 72 is mounted on a subsidiary lighting body support member 78, which will be detailed later. The extension 72 has a pair of left and right main lighting body opening portions 72a and a plurality of slits 72b, 72c, and 72d.

The left and right main lighting bodies 65 are exposed to the front through the left and right main lighting body opening portions 72a.

The slits 72b, 72c, and 72d are formed along edge portions on lower portions of the left and right main lighting body opening portions 72a.

The slits 72b, 72c, and 72d represent portions through which the light guide member 71 is exposed. A plurality of bridge portions 72e are formed, each being formed between each adjacent pair of the slits 72b, 72c, and 72d. The bridge portions 72e each extend across two edge portions which the slits 72b, 72c, and 72d face.

The light guide member 71 is partially covered in the extension 72 from the front as depicted in FIG. 4, so that the light guide member 71 can be given an accentuated light-emitting shape and a viewer can be given a novel impression.

Figure 5:
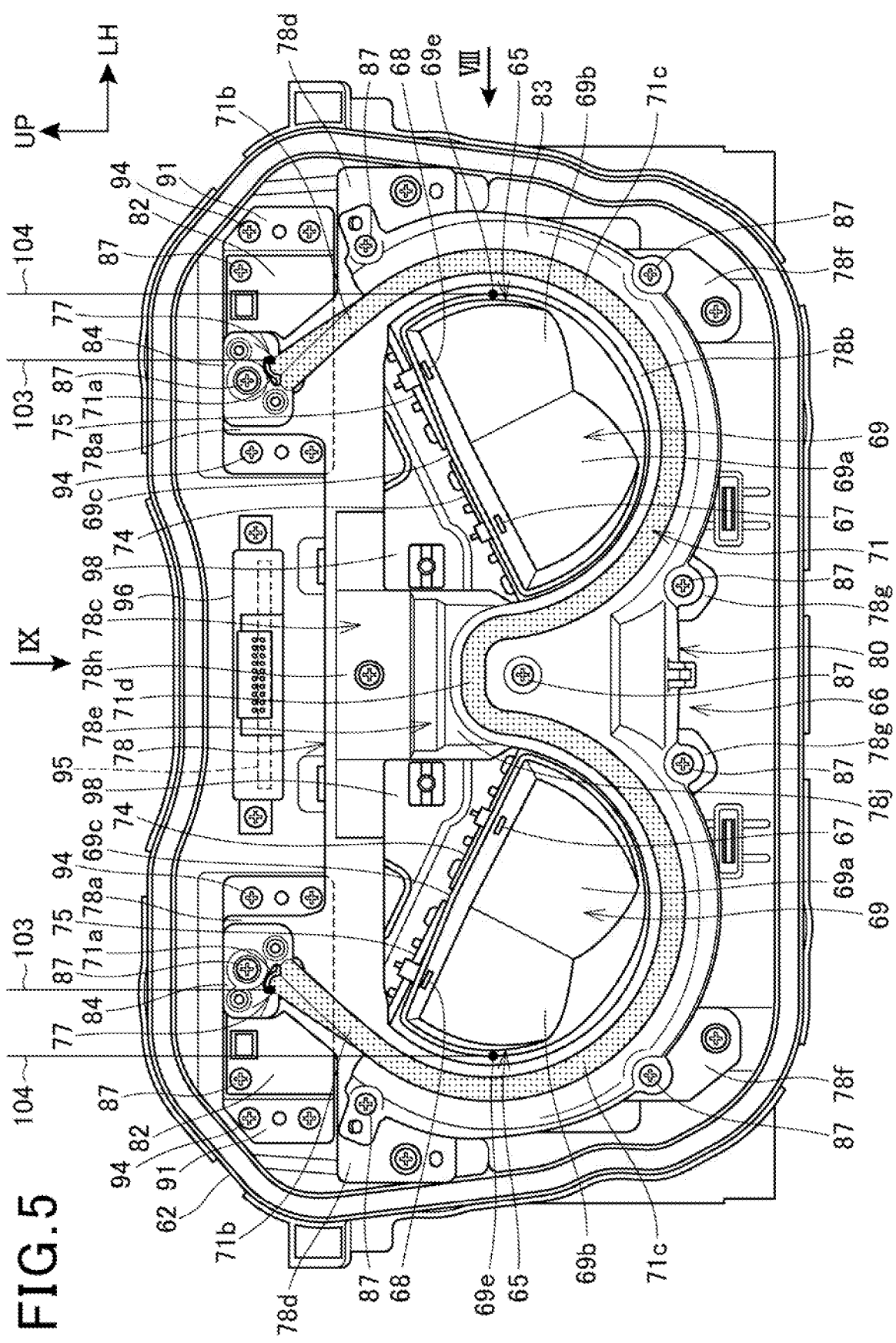
FIG. 5 is a front elevation view of the headlight, depicting a condition in which an extension has been removed from what is depicted in FIG. 4.
Figure 6:
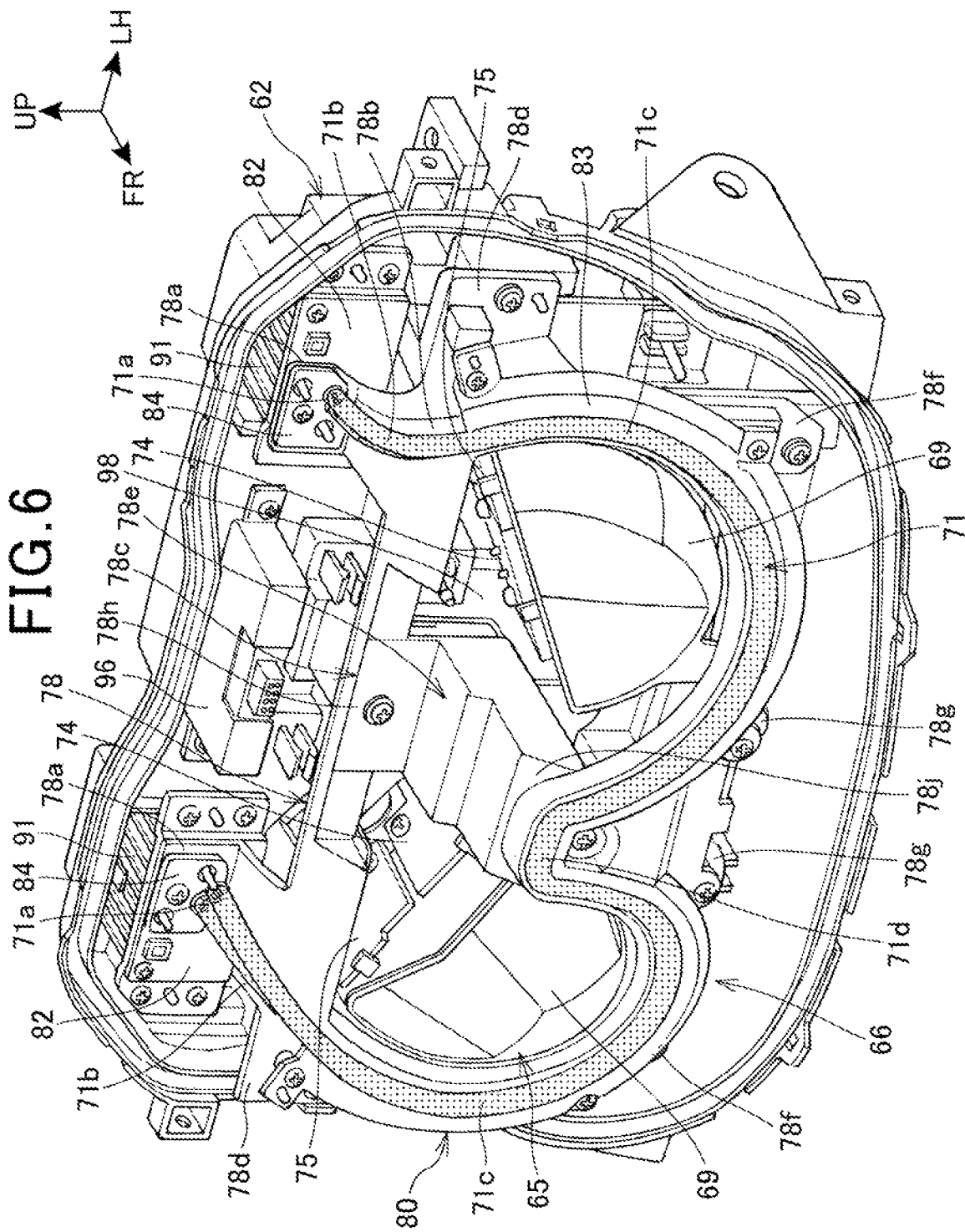
FIG. 6 is a perspective view of what is depicted in FIG. 5, as viewed from an obliquely superior side.

FIG. 5 is a front elevation view of the headlight 41, depicting a condition in which the extension 72 has been removed from what is depicted in FIG. 4. FIG. 6 is a perspective view of what is depicted in FIG. 5, as viewed from an obliquely superior side.

As depicted in FIGS. 3 to 5, the headlight 41 includes the housing 61, the lens 51, the left and right main lighting bodies 65, the subsidiary lighting body 66, and the extension 72.

As depicted in FIGS. 5 and 6, the low-beam light source 67 and the high-beam light source 68 of the main lighting body 65 are mounted on substrates 74 and 75, respectively, on an upper wall 69c of the reflector 69.

The reflector 69 has a substantially semi-circular shape in a front view. The upper wall 69c is flatly formed and inclined such that an end portion on the outside in a vehicle width direction is superior to an end portion on the inside in the vehicle width direction.

The substrates 74 and 75 are mounted on an upper surface of the upper wall 69c and are thus inclined. The substrate 75 is disposed obliquely superior to the substrate 74 on the outside in the vehicle width direction.

The subsidiary lighting body 66 includes a pair of light source groups 77 and an integrated light guide member molding 80. The light source groups 77 are disposed at upper portions of the housing main body 62 at left and right. The light guide member molding 80 is supported by the subsidiary lighting body support member 78, which is mounted on the housing main body 62. In the light guide member molding 80, the light guide member 71 illuminates with light emitted from the light source groups 77 at left and right.

The light source groups 77 each include a plurality of LED light sources. The LED light sources are mounted on each of a pair of left and right substrates 82.

The light guide member molding 80 integrally includes the light guide member 71, a curved portion mounting portion 83, and a pair of left and right end portion mounting portions 84.

The light guide member 71 is formed of a transparent resin. The light guide member 71 guides light from the light source groups 77 on the left and right and emits light. In a vehicle front view, the light guide member 71 is formed into an ω-shape that extends continuously along peripheries of the main lighting bodies 65 (specifically, the reflectors 69). The light guide member 71 is formed into a circular shape (or an elliptic shape) in cross section excluding left and right upper end portions (end portions 71a). The light guide member 71 has ends with increasing widths toward the end portions 71a as if the ends were each divided into two. The light source groups 77 are disposed so as to be closer to end faces of the end portions 71a having wider widths.

The light guide member 71 includes a pair of left and right upper portion inclined portions 71b, a pair of left and right side portion curved portions 71c, and a center bent portion 71d.

The left and right upper portion inclined portions 71b extend, in a vehicle front view, obliquely inferiorly to the outside in the vehicle width direction from the end portions 71a on the left and right of the light guide member 71. The left and right side portion curved portions 71c extend, in the vehicle front view, so as to protrude inferiorly and to curve from lower end portions of the left and right upper portion inclined portions 71b. The center bent portion 71d is bent, in the vehicle front view, into an inverted-U shape with the left and right side portion curved portions 71c having end portions inside in the vehicle width direction merged and protruding superiorly.

The curved portion mounting portion 83 is formed integrally with the left and right side portion curved portions 71c on the outside in the vehicle width direction and on the lower side, and with the center bent portion 71d on the lower side, throughout the left and right side portion curved portions 71c and the center bent portion 71d of the light guide member 71. The curved portion mounting portion 83 is mounted on the subsidiary lighting body support member 78 with a plurality of screws 87.

The end portion mounting portions 84 represent plate-shaped portions integrally formed with the end portions 71a on both ends of the light guide member 71.

Rays of light emitted from the light source groups 77 on the left and right travel from the respective end portions 71a on both sides of the light guide member 71 toward the side of the center bent portion 71d. The rays of light from the light source groups 77 on the left and right reach the center bent portion 71d, so that the amount of light is prevented from being reduced and brightness is achieved. In addition, the light guide member 71 is continuous at the center bent portion 71d, so that light from the light guide member 71 is prevented from leaking.

The substrates 82, on which the left and right light source groups 77 are mounted, are mounted on heat sinks 91, which are disposed at upper end portions at left and right of the housing main body 62, by the screws 87. The heat sinks 91 at the left and right are mounted at upper portions at left and right of the housing main body 62 by a plurality of screws 94.

Because the subsidiary lighting body 66 is used as a daytime running light (DRL) that is lit up at all times during daytime, the left and right light source groups 77 are rated as having high power consumption and a great heat value. Mounting the substrates 82 on the heat sinks 91 thus allows the light source groups 77 to dissipate more heat, and temperature can be prevented from rising.

When outdoor brightness (sky illuminance) from evening to night is equal to or smaller than a predetermined value, for example, the brightness of the light source groups 77 decreases and the subsidiary lighting body 66 lights up with the low-beam light sources 67 of the main lighting bodies 65, thereby functioning as a low-beam lighting body.

The left and right light source groups 77 are disposed superior to the low-beam light sources 67 and the high-beam light sources 68 of the left and right main lighting bodies 65 and are disposed superior to the left and right high-beam light sources 68.

A control substrate box 96 is disposed between the left and right heat sinks 91. The control substrate box 96 houses a control substrate 95, which controls emission of light (controls current) of the low-beam light sources 67 and the high-beam light sources 68 of the main lighting bodies 65 and the light source groups 77 of the subsidiary lighting body 66. The control substrate box 96 is mounted at the upper portion of the housing main body 62 at a central portion in the vehicle width direction.

The reflectors 69 of the left and right main lighting bodies 65 are supported by a pair of left and right main lighting body support members 98. The main lighting body support members 98 are mounted on the housing main body 62.

The subsidiary lighting body support member 78 integrally includes a pair of left and right upper portion mounting portions 78a, a light guide member support portion 78b, a widthwise extension portion 78c, a pair of left and right side portion mounting portions 78d, a fore-aft extension portion 78e, a pair of left and right lower portion outside mounting portions 78f, and a pair of left and right lower portion inside mounting portions 78g.

The left and right upper portion mounting portions 78a are mounted, together with the left and right end portion mounting portions 84 of the light guide member 71 and the left and right substrates 82, on the left and right heat sinks 91.

The light guide member support portion 78b is formed along the light guide member 71 into the ω-shape in the vehicle front view to thereby support the light guide member 71. The widthwise extension portion 78c extends in the vehicle width direction across left and right portions of the light guide member support portion 78b. The widthwise extension portion 78c has a central portion 78h mounted on the housing main body 62.

The left and right side portion mounting portions 78d protrude to the outside in the vehicle width direction from left and right side portions of the light guide member support portion 78b and are mounted on the housing main body 62. The fore-aft extension portion 78e protrudes anteriorly from a lower portion of the central portion 78h of the widthwise extension portion 78c to thereby extend in the fore-aft direction. The fore-aft extension portion 78e has a distal end portion 78j connected with a central portion of the light guide member support portion 78b.

The left and right lower portion outside mounting portions 78f protrude inferiorly from side portions on both sides of the light guide member support portion 78b and are mounted on the housing main body 62. The left and right lower portion inside mounting portions 78g protrude inferiorly from the light guide member support portion 78b, which is disposed inside the left and right lower portion outside mounting portions 78f in the vehicle width direction, and are mounted on the housing main body 62.

The curved portion mounting portion 83 of the light guide member molding 80 is mounted on the left and right side portion mounting portions 78d, the fore-aft extension portion 78e, the left and right lower portion outside mounting portions 78f, the left and right lower portion inside mounting portions 78g, and the distal end portion 78j of the fore-aft extension portion 78e, respectively, by the screws 87.

In FIGS. 4 and 5, the extension 72 covers, from the front, parts of the light guide member 71, specifically, the left and right end portions 71a, the left and right upper portion inclined portions 71b, parts of the left and right side portion curved portions 71c (portions posterior to each of the bridge portions 72e (posterior in the vehicle body)), and the center bent portion 71d.

The extension 72 further covers, from the front, the substrates 74 and 75 on the left and right, the widthwise extension portion 78c, the fore-aft extension portion 78e, and other parts of the subsidiary lighting body support member 78, and most of the curved portion mounting portion 83 of the light guide member molding 80.

In FIGS. 3 and 4, the housing cover 63 covers, from the front, the left and right low-beam light sources 67, and the left and right high-beam light sources 68.

Figure 7:
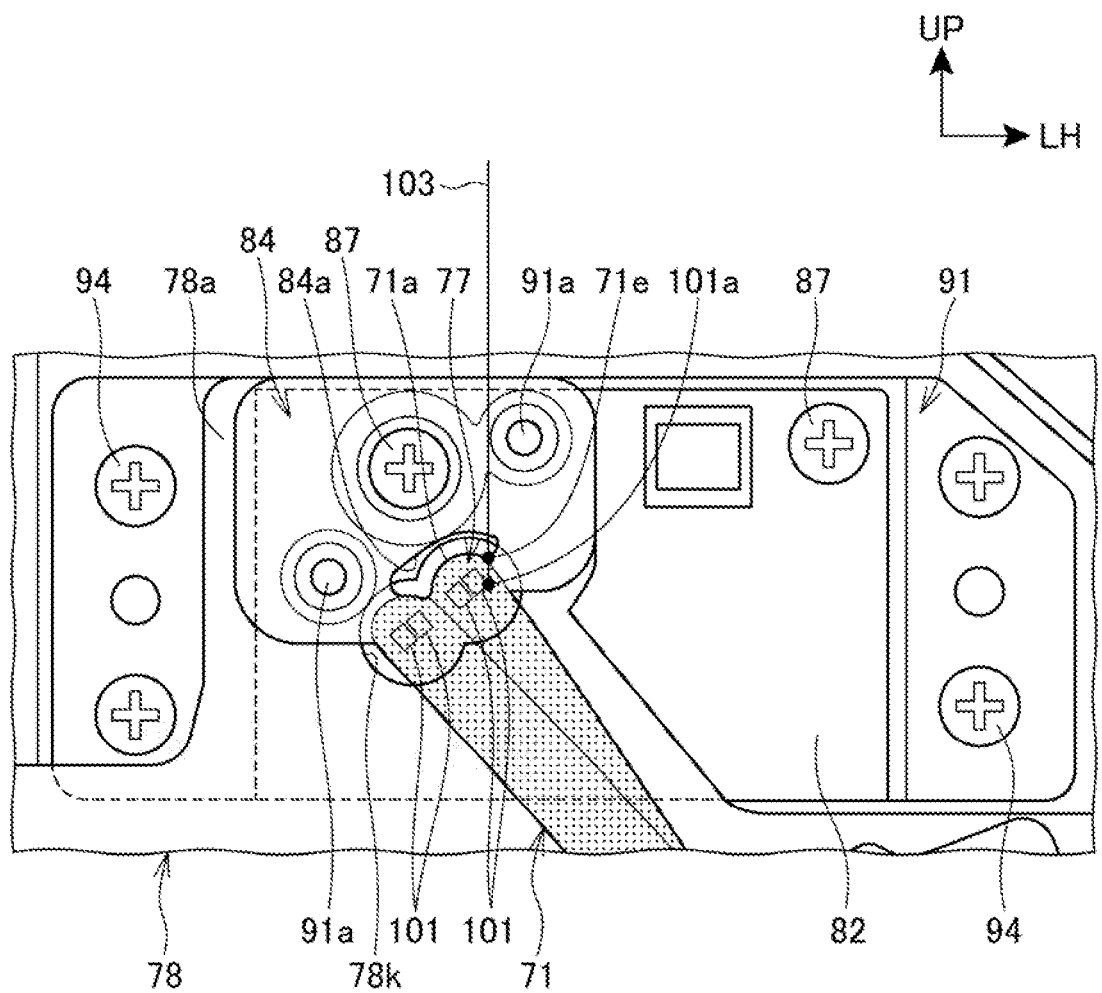
FIG. 7 is an enlarged view of major components of what is depicted in FIG. 5.

FIG. 7 is an enlarged view of major components of what is depicted in FIG. 5.

The subsidiary lighting body support member 78 includes the pair of left and right upper portion mounting portions 78a (FIG. 7 depicts only the upper portion mounting portion 78a on the left-hand side), which protrude superiorly. The left and right upper portion mounting portions 78a and the left and right end portion mounting portions 84 (FIG. 7 depicts only the end portion mounting portion 84 on the left-hand side) of the light guide member 71 are fastened jointly with the substrates 82 to the heat sinks 91 by the screws 87.

The heat sink 91 is provided with a pair of positioning pins 91a. The positioning pins 91a correctly position the substrate 82, the upper portion mounting portion 78a, and the end portion mounting portion 84.

The upper portion mounting portion 78a has an opening portion 78k, through which the light source group 77 on the substrate 82 is made to face the end portion 71a of the light guide member 71.

The end portion 71a of the light guide member 71 has a cross section having, what is called, a "pear-shaped" outline with two circles partially overlapping each other. The end portion 71a thus has a cross-sectional area greater than other portions of the light guide member 71.

The end portion mounting portion 84 of the light guide member 71 has an opening portion 84a. The opening portion 84a is formed at a position adjacent to the end portion 71a. The opening portion 84a allows the end portion 71a and the light source group 77 to face an inside of the housing 61 via the opening portion 78k in the upper portion mounting portion 78a.

The light source group 77 includes a single or a plurality of LED light sources 101. The single or a plurality of LED light sources 101 are disposed in each of the two circles of the end portion 71a of the light guide member 71 in a front view. Alternatively, the light source group 77 may be a single light source 77 disposed within the two circles of the end portion 71a of the light guide member 71 in a front view.

Reference is made to FIGS. 5 and 7. Consider two vertical lines 103 and 104. The vertical line 103 is drawn to pass through outer ends 71e and 101a, which are located at outermost ends in the vehicle width direction of the upper end portion of the light guide member 71 and the light source groups 77 (specifically, the LED light sources 101). The vertical line 104 is drawn to pass through an outer end 69e, which is located at an outermost end in the vehicle width direction of the main lighting body 65 (specifically, the reflector 69). In this case, the vertical line 103 is disposed inside the vertical line 104 in the vehicle width direction. Specifically, the upper end portion of the light guide member 71 and the light source groups 77 are disposed inside the main lighting body 65 in the vehicle width direction.

The foregoing configuration enables the upper portion of the headlight 41 (see FIG. 2) to have a narrow width in the vehicle width direction, so that reduction in size of the headlight 41 can be promoted.

The enlarging of the cross-sectional area of the end portion 71a of the light guide member 71 enables a greater number of LED light sources 101 to face the end portion 71a of the light guide member 71. The amount of light to be guided can thereby be further increased, and the light guide member 71 can be illuminated even more brightly.

The provision of the opening portion 84a in the end portion mounting portion 84 can promote heat dissipation (heat dissipation by radiation and convection of heat) from the light source groups 77 into the housing 61, so that the temperature of the light source groups 77 can be prevented from rising.

Figure 8:
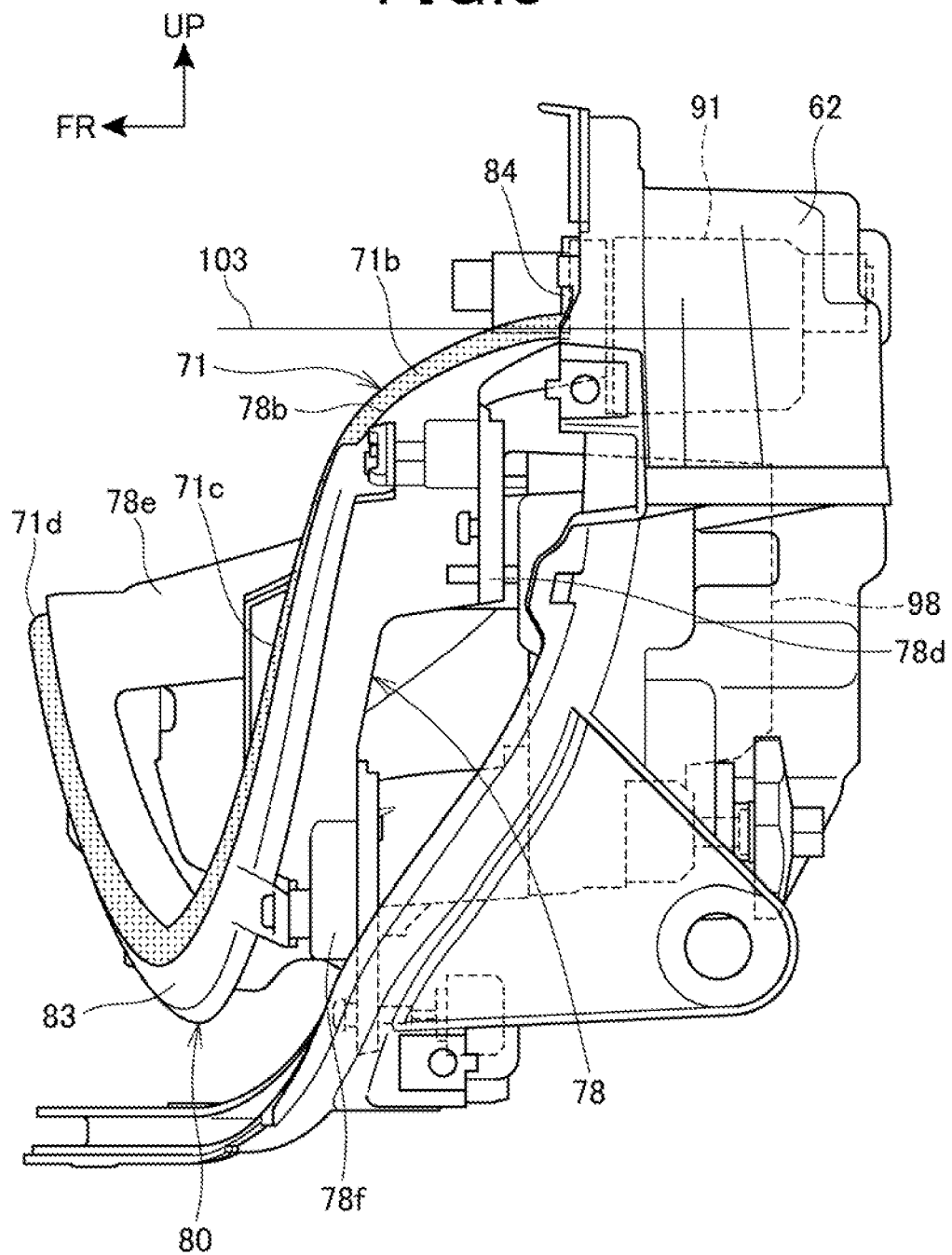
FIG. 8 is a view on arrow VIII in FIG. 5.
Figure 9:
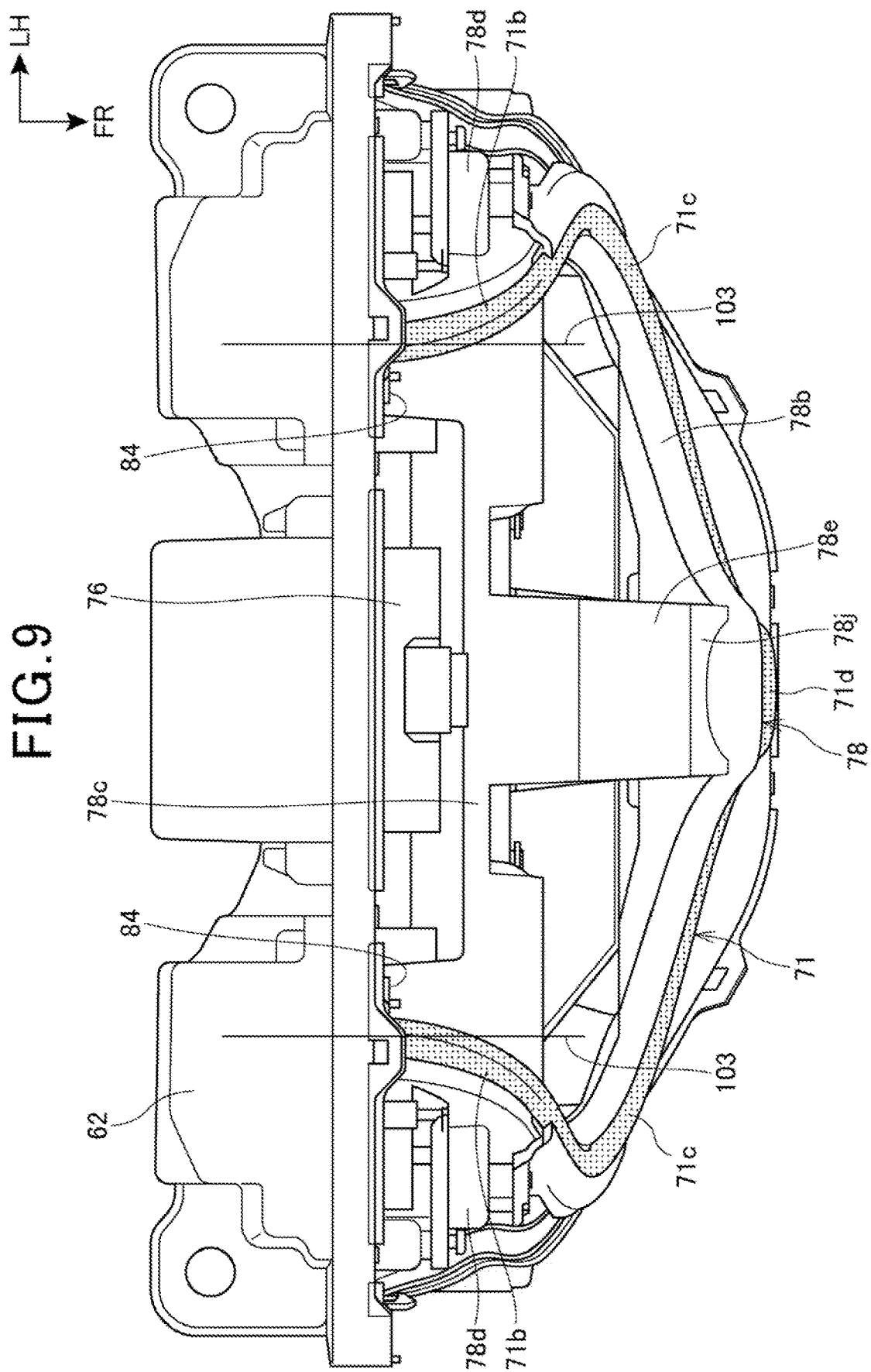
FIG. 9 is a view on arrow IX in FIG. 5.

FIG. 8 is a view on arrow VIII in FIG. 5. FIG. 9 is a view on arrow IX in FIG. 5.

As depicted in FIG. 8, in a vehicle side view, the upper portion inclined portion 71b of the light guide member 71 extends along the vertical line 103 that extends from the end portion 71a (see FIG. 7) in the fore-aft direction (a straight line corresponding to an optical axis of the LED light source 101 (see FIG. 7)) before curving inferiorly. In the vehicle side view, the side portion curved portion 71c extends from an end portion of the upper portion inclined portion 71b inferiorly and obliquely anteriorly and is bent to further extend superiorly and obliquely anteriorly, before reaching the center bent portion 71d.

As depicted in FIG. 9, in a plan view, the upper portion inclined portion 71b of the light guide member 71 extends along the vertical line 103 from the end portion 71a (see FIG. 7) before curving to the outside in the vehicle width direction. In the plan view, the side portion curved portion 71c extends from the end portion of the upper portion inclined portion 71b and curves further to the outside in the vehicle width direction before curving toward the inside in the vehicle width direction. The side portion curved portion 71c extends obliquely anteriorly toward the inside in the vehicle width direction. The side portion curved portion 71c curves anteriorly upon approaching the center bent portion 71d and eventually reaches the center bent portion 71d.

In FIGS. 8 and 9, the center bent portion 71d is located at a frontmost portion of the light guide member 71.

The light guide member 71, because extending in all points thereof anteriorly from the end portion 71a, can efficiently guide light from the left and right light source groups 77 (see FIG. 5) to the center bent portion 71d and prevent the light from leaking. Thus, the amount of light can be prevented from gradually decreasing from the end portion 71a toward the center bent portion 71d and the amount of light on the side of the center bent portion 71d can be obtained.

As described with reference to FIGS. 3 to 5, the headlight 41 includes the housing 61, the lens 51, which covers the front surface of the housing 61, the main lighting bodies 65, which are housed in the housing 61 and include the left and right headlights emitting light, the light guide member 71, which is formed into the continuous ω-shape extending along the peripheries of the two-headlight main lighting bodies 65, and the extension 72, which partially covers the light guide member 71 from the front.

The light guide member 71 and the light source groups 77, which serve as the light guide member light sources emitting light to be guided to the light guide member 71, constitute the subsidiary lighting body 66. The center bent portion 71d, which serves as the central portion of the light guide member 71, is bent at a position posterior to the extension 72.

Through the foregoing configuration, because the light guide member 71 is formed so as to continuously extend along the peripheries of the left and right main lighting bodies 65, the amount of light at the center bent portion 71d of the light guide member 71 can be obtained by the rays of light from the left and right light source groups 77 being supplemented each other. In addition, light can be prevented from leaking to the outside and appearance of the headlight 41 as the lighting apparatus can be enhanced. Additionally, the shape of the light guide member 71 is simplified and thus cost can be reduced.

As depicted in FIG. 5, the light guide member 71 is formed into the ω-shape in the vehicle front view and the light source groups 77 are disposed at the upper end portions on both sides in the vehicle width direction of the ω-shape.

Through the foregoing configuration, the light emitted from the upper end portions of the light guide member 71 can be brought up to the central portion of the light guide member 71 and the amount of light at the central portion of the light guide member 71 can be obtained.

As depicted in FIG. 5, the light source group 77 represents a plurality of LEDs or a single LED and consumes electricity more than the low-beam light sources 67 and the high-beam light sources 68, which serve as the main lighting body light sources included in the main lighting bodies 65, do. The substrates 82, on which the light source groups 77 are mounted, are mounted, together with the heat sinks 91, which cool the light source groups 77, at the upper portions at left and right of the housing 61.

Through the foregoing configuration, disposing the light source groups 77 having a high heat value at the upper portions at left and right of the housing 61, together with the heat sinks 91, allows heat dissipation from the light source groups 77 to be promoted, so that the temperature of the light source groups 77 can be prevented from rising.

The outer ends 71e and 101a, which represent the outer ends in the vehicle width direction of the light source groups 77 and the light guide member 71, are disposed inside the outer ends in the vehicle width direction of the main lighting bodies 65 in the vehicle width direction.

Through the foregoing configuration, the width of the upper portion of the headlight 41 in the vehicle width direction can be narrowed and reduction in size of the headlight 41 can be promoted.

As depicted in FIGS. 7 to 9, the light guide member 71 protrudes more anteriorly at increasing distances from the light source groups 77.

Through the foregoing configuration, the light emitted from the light source groups 77 can be efficiently brought up to the center bent portion 71d of the light guide member 71. Thus, the side of the center bent portion 71d can be illuminated even more brightly.

As depicted in FIG. 5, the low-beam light sources 67 and the high-beam light sources 68 are LEDs and disposed inferior to the light source groups 77.

The foregoing configuration, in which the low-beam light sources 67 and the high-beam light sources 68, which consume electricity less than the light source groups 77 do, are disposed inferior to the light source groups 77, allows performance of the headlight 41 to dissipate heat to be promoted. Additionally, the low-beam light sources 67 and the high-beam light sources 68 are spaced vertically away from the light source groups 77. This enables a thermal effect from the light source groups 77 on the low-beam light sources 67 and the high-beam light sources 68 to be reduced.

As depicted in FIGS. 5 and 7, the end portion mounting portion 84, which is mounted on the heat sink 91, is integrally formed with the end portion 71a of the light guide member 71 and the end portion mounting portion 84 and the substrate 82 are jointly fastened to the heat sink 91 by the screws 87. The end portion mounting portion 84 and the substrate 82 are positioned by the pair of positioning pins 91a, which are provided for the heat sink 91.

Through the foregoing configuration, the light guide member 71 and the substrates 82 can be easily mounted on the heat sinks 91, so that assemblability can be enhanced.

As depicted in FIG. 7, the end portion mounting portion 84 has the opening portion 84a at a position near the end portion 71a of the light guide member 71.

Through the foregoing configuration, heat can be dissipated from the opening portion 84a, so that temperature of the light source groups 77 can be prevented from rising.

Additionally, as depicted in FIG. 5, the control substrate 95, which serves as a controller for controlling emission of light of the light source groups 77, is disposed between the left and right light source groups 77. Thus, the control substrate 95 can be disposed through an effective use of a dead space superior to the light guide member 71 having the ω-shape in the front view.

It should be understood that the embodiment of the invention described above is illustrative only and not limiting, and various changes in form and detail may be made therein without departing from the spirit and scope of the invention.

For example, the configuration, in which the left and right reflectors 69, the subsidiary lighting body support member 78, and the main lighting body support members 98 are separately provided in the housing main body 62 of the housing 61 as depicted in FIG. 6 in the embodiment, is illustrative only and not limiting. At least either one of the reflectors 69, the subsidiary lighting body support member 78, and the main lighting body support members 98 may be provided integrally with the housing main body 62.

In addition, the present invention can be applied to, not only the motorcycle 10, but also a saddle riding vehicle including a type other than the motorcycle 10.

DESCRIPTION OF REFERENCE SYMBOLS

10 Motorcycle (saddle riding vehicle)
41 Headlight (lighting apparatus)
51 Lens
61 Housing
65 Main lighting body
66 Subsidiary lighting body
67 Low-beam light source (main lighting body light source)
68 High-beam light source (main lighting body light source)
71 Light guide member
71d Center bent portion (central portion)
72 Extension
77 Light source group (light guide member light source)
82 Substrate
84 End portion mounting portion
84a Opening portion
91 Heat sink
95 Control substrate

The invention claimed is:
1. A lighting apparatus comprising:
a housing;
a lens that covers a front surface of the housing;

a pair of main lighting bodies housed in the housing, the main lighting bodies including left and right two headlights emitting light;

a light guide member formed to extend continuously along peripheries of the two-headlight main lighting bodies; and an extension that partially covers the light guide member from a front, wherein the light guide member, and a light guide member light source emitting light to be guided to the light guide member, constitute a subsidiary lighting body, and the light guide member has a central portion bent at a position posterior to the extension.

2. The lighting apparatus according to claim 1, wherein the light guide member is formed into an ω-shape in a vehicle front view, and the light guide member light source is disposed at each upper end portion on both sides in a vehicle width direction of the ω-shape.

3. The lighting apparatus according to claim 1, wherein the light guide member light source is a light emitting diode and consumes electricity more than main lighting body light source included in the main lighting bodies does, and a substrate, on which the light guide member light source is mounted, is mounted, together with a heat sink, at each upper portion at left and right of the housing.

4. The lighting apparatus according to claim 3, wherein the light guide member light source and the light guide member have outer ends in the vehicle width direction disposed inside each outer end in the vehicle width direction of the main lighting bodies in the vehicle width direction.

5. The lighting apparatus according to claim 3, wherein the light guide member protrudes more anteriorly at increasing distances from the light guide member light source.

6. The lighting apparatus according to claim 3, wherein the main lighting body light source is a light emitting diode and disposed inferior to the light guide member light source.

7. The lighting apparatus according to claim 3, wherein an end portion mounting portion mounted on the heat sink is integrally formed with an end portion of the light guide member, and the end portion mounting portion and the substrate are jointly fastened to the heat sink.

8. The lighting apparatus according to claim 7, wherein the end portion mounting portion has an opening portion at a position near the end portion of the light guide member.

9. The lighting apparatus according to claim 1, further comprising:

a controller, disposed between a pair of the light guide member light sources at left and right, for controlling emission of light of the light guide member light sources.

* * * * *